United States Patent [19]

Uematsu et al.

[11] Patent Number: 4,688,048

[45] Date of Patent: Aug. 18, 1987

[54] DROP-ON-DEMAND INK-JET PRINTING APPARATUS

[75] Inventors: Ryosuke Uematsu; Toyoji Ushioda; Hiromichi Fukuchi, all of Tokyo, Japan

[73] Assignee: Nec Corporation, Japan

[21] Appl. No.: 903,736

[22] Filed: Sep. 4, 1986

[30] Foreign Application Priority Data

Sep. 5, 1985 [JP] Japan .............................. 60-197027

Sep. 30, 1985 [JP] Japan .............................. 60-218377

[51] Int. Cl.[4] .............................. G01D 15/18

[52] U.S. Cl. .............................. 346/1.1; 346/140 R

[58] Field of Search .............................. 346/140, 1.1

[56] References Cited

U.S. PATENT DOCUMENTS

| | | | |
|---|---|---|---|
| 4,189,734 | 2/1980 | Kyser et al. | 346/1.1 |
| 4,525,728 | 6/1985 | Koto | 346/140 |
| 4,549,191 | 10/1985 | Fukuchi | 346/140 |

OTHER PUBLICATIONS

Kyser et al; Design of an Impulse Ink Jet, Jr. App. Photo Engr., vol. 7, No. 3, Jun. 1981, pp. 73–79.

Beasley, J. D.; Model for Fluid Ejection and Refill in an Impulse Drive Jet, Photogr. Sci. Eng., 21:78–82 (1977).

*Primary Examiner*—Joseph W. Hartary

*Attorney, Agent, or Firm*—Laff, Whitesel, Conte & Saret

[57] ABSTRACT

A drop-on-demand ink-jet printing head has an ink chamber filled with ink from an ink supply reservoir. The ink chamber has a deflectable upper elastic surface, a deflection of which increases ink fluid pressure. A deflection of said surface exciting a plurality of resonant pressure vibration modes within the chamber. A pressure increase within the chamber causing an ink droplet to be projected out a nozzle at one end of the chamber. A piezoelectric transducer is fixed on the elastic surface to deflect it and excite resonant vibration with a plurality of nodes and loops or antinodes. The transducer is positioned on the elastic surface at one of the loops or antinodes of a preselected one of the pressure vibration modes to excite the pressure modes with a short time constant (high frequency) which enables a very fine droplet of small volume to be projected. This can be done without reducing the cross sectional area of the nozzle or the velocity of the droplet.

15 Claims, 26 Drawing Figures

FIG. 6 (a)
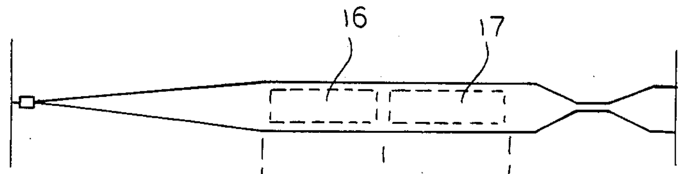
FIG. 6 (b)
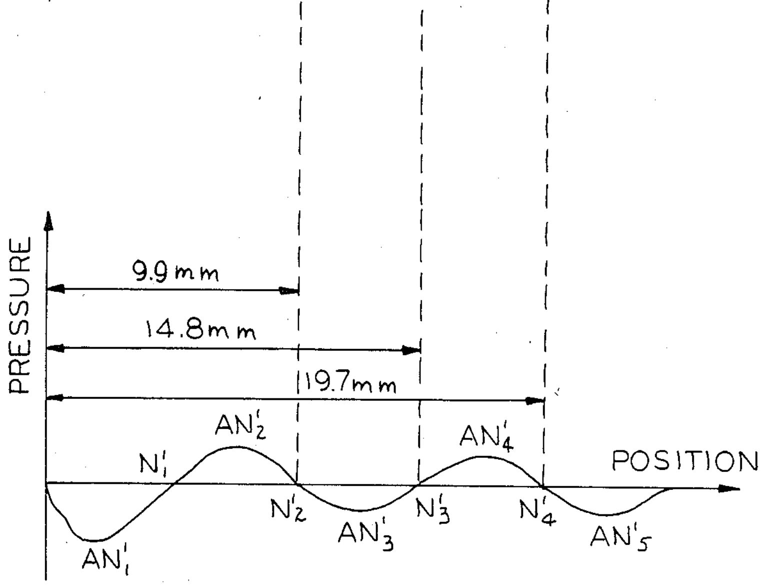
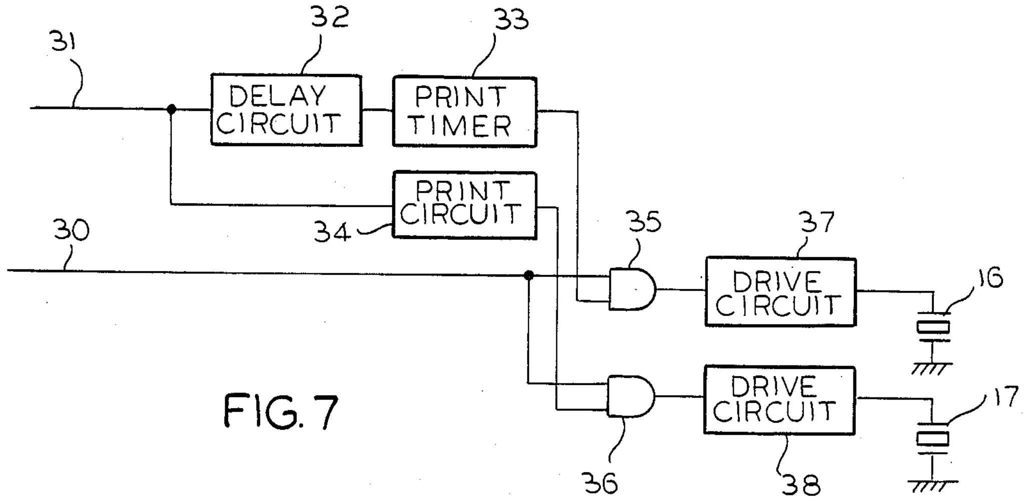
FIG. 7

DROP-ON-DEMAND INK-JET PRINTING APPARATUS

BACKGROUND OF THE INVENTION

The present invention relates to a drop-on-demand ink-jet printing apparatus, and more particularly, to an ink-jet printing head in which a droplet of printing fluid is ejected from a nozzle by a volume displacement thereof.

A well known ink-jet printing apparatus prints a desired pattern on a recording medium, such as paper, by depositing discrete droplets of printing fluid (ink) on the recording medium. One such ink-jet printing apparatus is disclosed in U.S. Pat. No. 4,189,734 issued to Kyser et al. Kyser et al. teach a structure of a printing head which includes a deflection plate bonded to a base plate to form a chamber. The chamber is filled with the ink and is provided with a nozzle at one end. A piezoelectric transducer is bonded to the deflection plate and connected to an electronic driver circuit. Upon application of voltage across the piezoelectric transducer, the transducer contracts to cause the deflection plate to deflect inwardly into the chamber. Thus, the volume of the chamber is reduced, causing a droplet of the printing fluid to be ejected from the orifice of the nozzle.

In the conventional apparatus, the piezoelectric transducer is fixed on the deflection plate at a position which is unrelated to the pressure vibration modes of the ink in the chamber. Accordingly, the piezoelectric transducer generates a pressure vibration wave combining a plurality of the pressure vibration modes.

In order to print Chinese characters, half-tone images, and the like with a high printing resolution, an ink-jet printing apparatus is required to generate a fine droplet of ink, i.e. to reduce the volume of the droplet. In general, the droplet volume Q is related to the sectional area A of the nozzle, the droplet velocity v(t) at the orifice of the nozzle, the time $t_1$ when the pressure of the piezoelectric transducer is applied to the ink in the chamber, and the time $t_2$ when the droplet of the ink is separated from the orifice of the nozzle, as follows:

$$Q = A \int_{t_1}^{t_2} v(t)dt \tag{1}$$

The droplet velocity v(t) is proportional to the voltage applied to the piezoelectric transducer. The period of time from $t_1$ to $t_2$ is determined by the configuration of the chamber and the disposition of the piezoelectric transducer with respect to the chamber.

According to formula (1), the droplet volume Q is reduced if the sectional area A of the nozzle is decreased. However, it is difficult to manufacture a fine nozzle, and a fine nozzle is apt to be plugged with ink. Another way to reduce the droplet volume Q is to decrease the droplet velocity v(t), i.e., to decrease the voltage applied to the piezoelectric transducer. However, a low speed droplet is difficult to project accurately due to the deflection of its trajectory. Accordingly, a fine ink droplet is difficult to obtain in the conventional ink-jet printing head.

SUMMARY OF THE INVENTION

Therefore an object of the present invention is to provide a drop-on-demand ink-jet printing apparatus capable of generating fine droplets of ink without reducing either the sectional area of the nozzle or the droplet velocity.

A drop-on-demand ink-jet printing apparatus, according to the present invention, comprises an ink chamber connected to an ink supply means and filled with an ink from the ink supply means. The ink chamber includes a nozzle for projecting an ink droplet and an elastic surface for changing the volume of said ink chamber by its deflection. A plurality of pressure vibration modes having a plurality of antinodes can be generated within said ink chamber. A piezoelectric transducer is fixed on the elastic surface at a position corresponding to one of the antinodes of a preselected one of the pressure vibration modes. Therefore, the piezoelectric transducer excites only the preselected pressure vibration mode in said ink chamber to project a fine, low volume ink droplet from the nozzle.

BRIEF DESCRIPTION OF THE DRAWINGS

FIGS. 6(*a*) and 6(*b*) illustrate fixed positions of piezoelectric transducers shown in FIG. 5(*a*);

FIG. 7 is a block diagram of a drive means for the ink-jet apparatus of the second embodiment;

DESCRIPTION OF THE EMBODIMENTS

Figure 1:
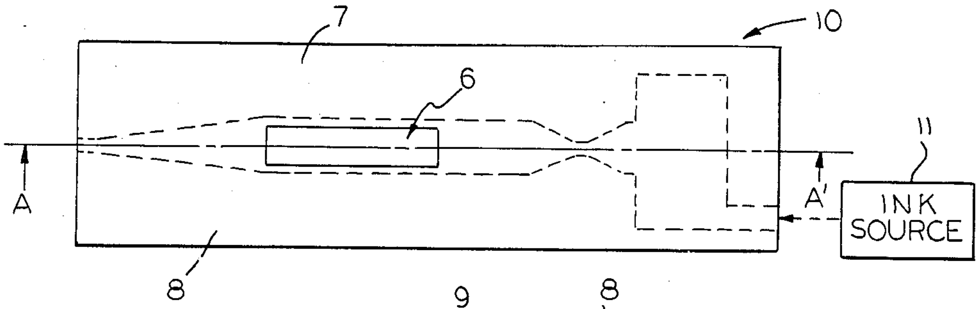
FIGS. 1(*a*) and 1(*b*) are respectively a plan view and a horizontal section of a ink-jet printing apparatus, according to a first embodiment of the invention, and FIG. 1(*c*) is a vertical sectional view taken along the line A—A′ of FIG. 1 (*a*)
Figure 1:
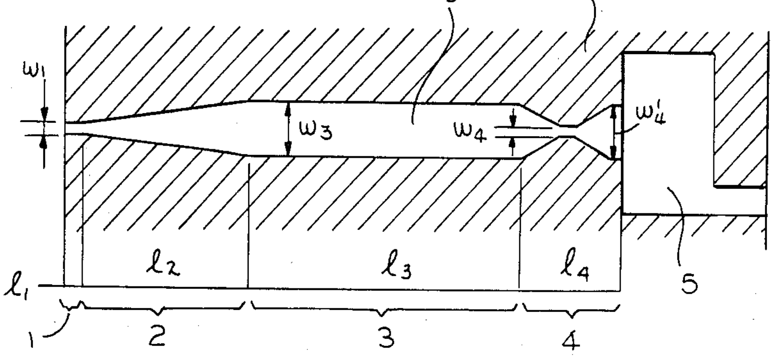
Figure 1:
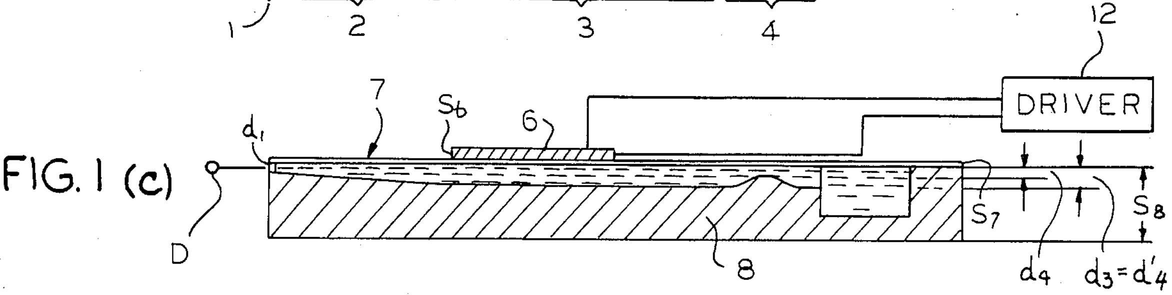

FIGS. 1(*a*), 1(*b*), and 1(*c*) show an ink-jet printing head 10 according to a first embodiment of the present invention as comprising a base plate 8 on which concave sections are formed An elastic plate 7 is fixed on the base plate 8 to form an ink reservoir 5 and an ink chamber 9. The ink chamber 9 includes a nozzle portion 1, an ink path portion 2, a pressure applied portion (main chamber) 3, and an ink supply path portion 4. The ink reservoir 5 stores ink supplied by an ink source 11 and supplies it to the ink chamber 9, via the ink supply path 4. A piezoelectric transducer 6 is fixedly secured on the elastic plate 7, at a position above the main chamber 3. The piezoelectric transducer 6 is connected to a drive circuit 12 which supplies drive pulse thereto, generating an ink droplet D (FIG. 1(*c*)).

In the first embodiment, the axial lengths $\mathbf{l}_1$, $\mathbf{l}_2$, $\mathbf{l}_3$, and $\mathbf{l}_4$ of the nozzle 1, the ink path portion 2, the main chamber 3 and the ink supply path portion 4 are 0.8 mm, 9 mm, 11 mm, and 4.5 mm, respectively. The widths $w_1$, $w_3$, $w_4$, and $w'_4$ of the nozzle 1, the main chamber 3, and the narrow and wide portions of the ink supply path portion 4 are 70 μm, 1.6 mm, 70 μm and 1.6 mm, respectively. The depths $d_1$, $d_3$, $d_4$, and $d'_4$ of the nozzle 1, the main chamber 3, the narrow and wide portions of the ink supply path portion 4 are 40 μm, 50 μm, 40 μm and 50 μm, respectively. The thicknesses $S_6$, $S_7$, and $S_8$ of the piezoelectrical transducer 6, the elastic plate 7 and the base plate 8 are 0.2 mm, 0.1 mm, and 1.5 mm, respectively. The elastic plate 7 and the base plate 8 are made of stainless steel.

Figure 2:
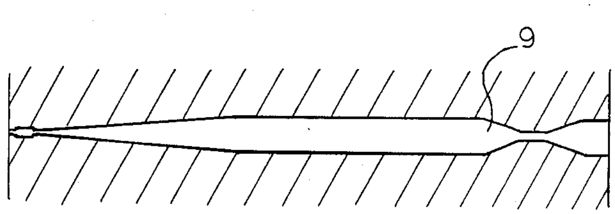
FIGS. 2(*a*) and 2(*b*) illustrate a positional relationship between natural fluid pressure vibration modes and an ink chamber shown in FIG. 1(*b*)
Figure 2:
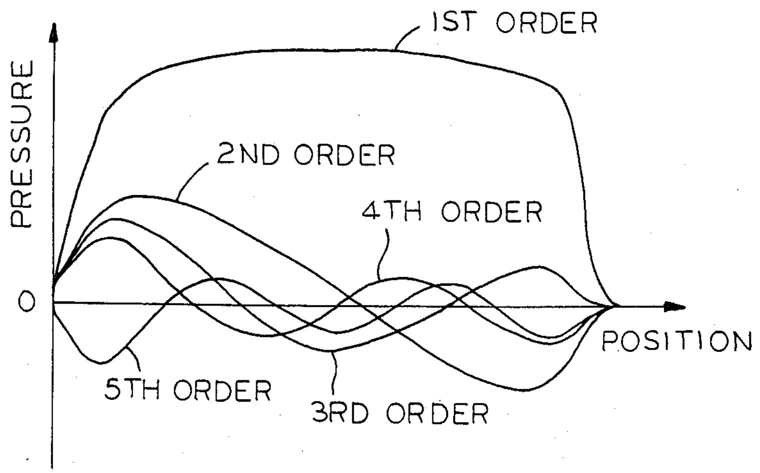

FIGS. 2(*a*) and 2(*b*) show the positional relationship between the chamber 9 shown in FIG. 1(*b*) and natural fluid pressure vibration modes generated in the chamber 9. As shown in FIG. 2(*b*), the amplitudes of the pressure vibration is always zero on both the front and rear edges of the chamber 9. That is, the vibration does not occur at the nozzle 1 and the ink supply path 4. Between the front and rear edges, the 1st to 5th order modes for the pressure vibration harmonics are generated. For instance, the 2nd order mode for the pressure vibration has twice the frequency of the 1st order mode, and has two antinodes (loops) and one node. The natural resonant periods $\tau_1$ to $\tau_5$ for the 1st to 5th order modes are measured at 87.8 μsec, 22.3 μsec, 12.8 μsec, 9.1 μsec, and 6.9 μsec.

Figure 3:
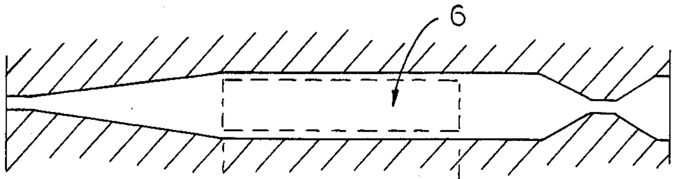
FIGS. 3(*a*) and 3(*b*) illustrate a fixed position of a piezoelectric transducer shown in FIG. 1(*a*)
Figure 3:
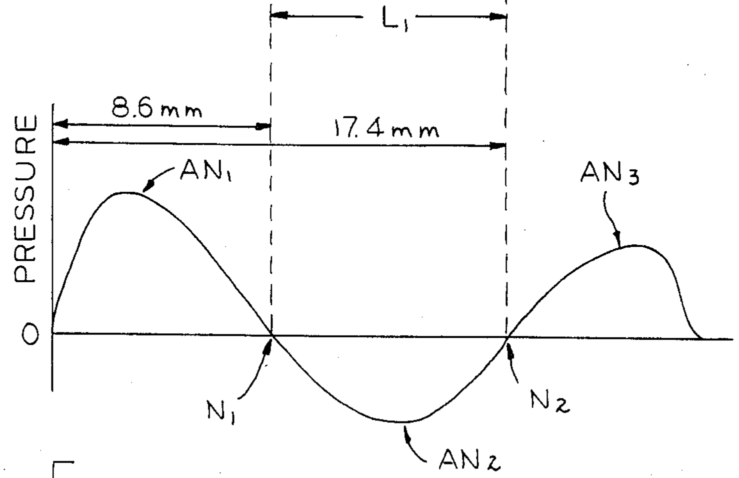

In FIGS. 3(a) and 3(b), the piezoelectric transducer 6 is provided to excite the 3rd order mode for the pressure vibration harmonics in the first embodiment of the invention. The transducer 6 is fixed on the elastic plate 7, at the position corresponding to second loop or antinode $AN_2$ of the 3rd order mode, i.e., the length $L_1$ of the transducer 6 is equal to the length between first and second nodes $N_1$ and $N_2$, which are spaced from the nozzle end by 8.6 mm and 17.4 mm, respectively.

Figure 4:
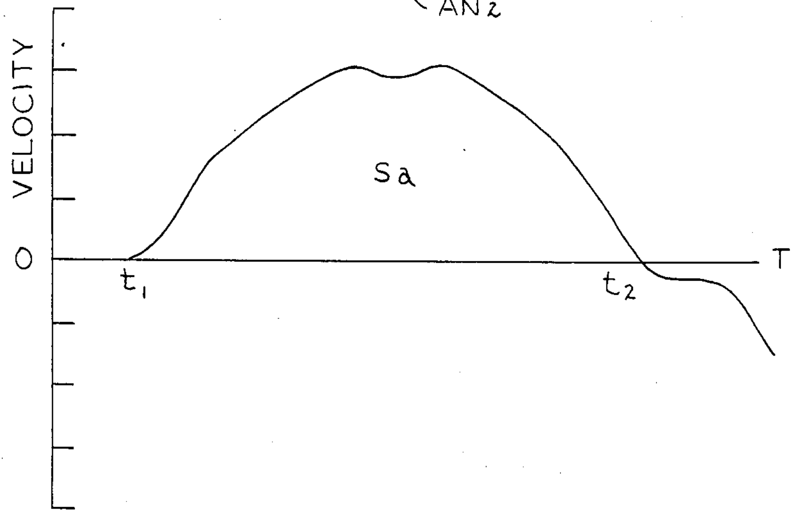
FIGS. 4(*a*) and 4(*b*) are graphs showing ink velocity as a function of time.
Figure 4:
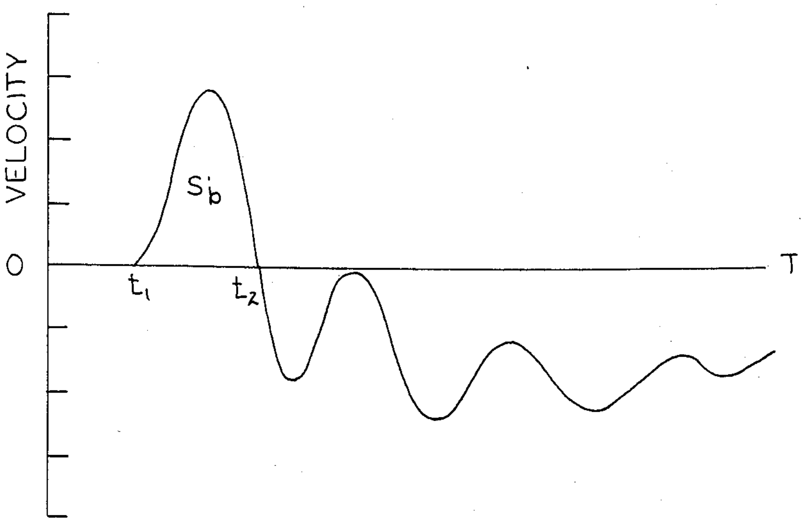

The velocity of the ink at the nozzle 1 of the first embodiment is illustrated in the graph of FIG. 4(*b*). Since the piezoelectric transducer 6 excites the 3rd order mode, the ink ejecting time represented from $t_1$ to $t_2$ is shortened in comparison with FIG. 4(*a*) which illustrates the case of the conventional head. That is, in FIG. 4(*b*) the positive area under the droplet velocity curve $$S_b = \int_{t_1}^{t_2} v(t)dt$$

for use in formula (1) is smaller than the analogous area $S_a$ of FIG. 4(*a*), with the result that the droplet volume Q is reduced.

Figure 5:
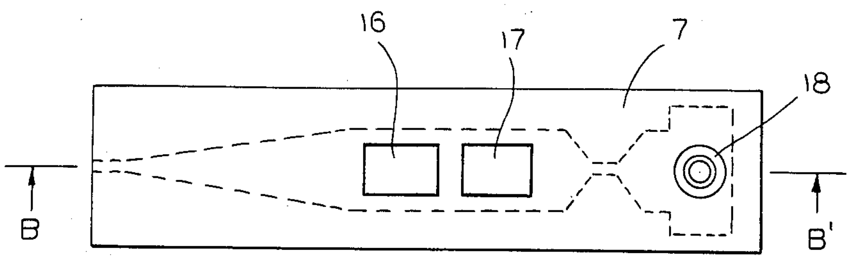
FIGS. 5(*a*) and 5(*b*) are respectively a plan view and a horizontal section of an ink-jet printing apparatus according to a second embodiment of the invention, and FIG. 5(*c*) is a vertical sectional view taken along the line B—B′ of FIG. 5(*a*)
Figure 5:
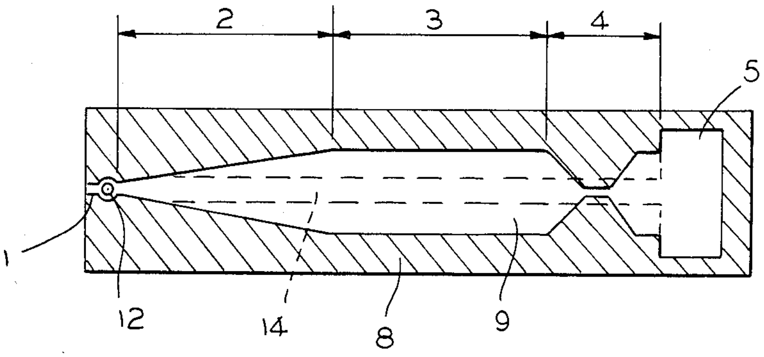
Figure 5:
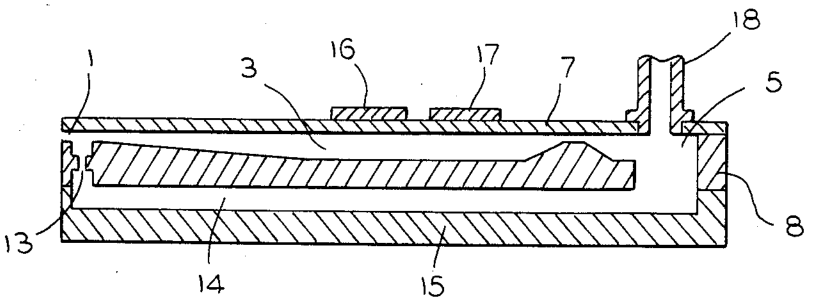

FIGS. 5(*a*) to 5(*c*) show a second embodiment of the invention. As shown in FIG. 5(*b*), the configuration of a chamber 9 is the same as for the first embodiment. However, under the chamber 9, another ink supply path 14 is provided which connects the ink reservoir 5 to the nozzle 1 via an ink supply hole 13 and a small ink reservoir 12, as described in U.S. Pat. No. 4,549,191. The ink supply path 14 is formed on an ink supply plate 15 which is bonded to the base plate 8. Ink is supplied to the ink reservoir 5 from the ink source 11, via a tube 18. First and second piezoelectric transducers 16 and 17 are fixed on the elastic plate 7, at the positions described below.

In FIGS. 6(*a*) and 6(*b*), the first and second piezoelectric transducers 16 and 17 are provided to excite the 5th order mode for the pressure vibration harmonics, in the second embodiment of the present invention. The first transducer 16 is fixed on the elastic plate 7 at the position corresponding to third loop or antinode $AN'_3$ of the 5th order mode. The second transducer 17 is fixed at the position corresponding to fourth loop or antinode $AN'_4$. The length $L'_1$ of the first transducer 16 and the length $L'_2$ of the second transducer 17 are substantially equal to the length between nodes $N'_2$ and $N'_3$ and between nodes $N'_3$ and $N'_4$, respectively. The distances from the front end of the nozzle 1 to the nodes $N'_2$, $N'_3$ and $N'_4$ are 9.9 mm, 14.8 mm and 19.7 mm., respectively.

The first and second transducers 16 and 17 are connected to drive circuits 37 and 38, respectively, as shown in FIG. 7. Print timing pulse generators 33 and 34 send a drive signal to the drive circuits 37 and 38 via AND gates 35 and 36, respectively. The AND gates 35 and 36 are made conductive in responsive to a print data signal 30. A print timing signal 31 is supplied to the pulse generator 33 via a delay circuit 32. The pulse generator 34 is directly supplied with the same timing signal 31.

Figure 8:
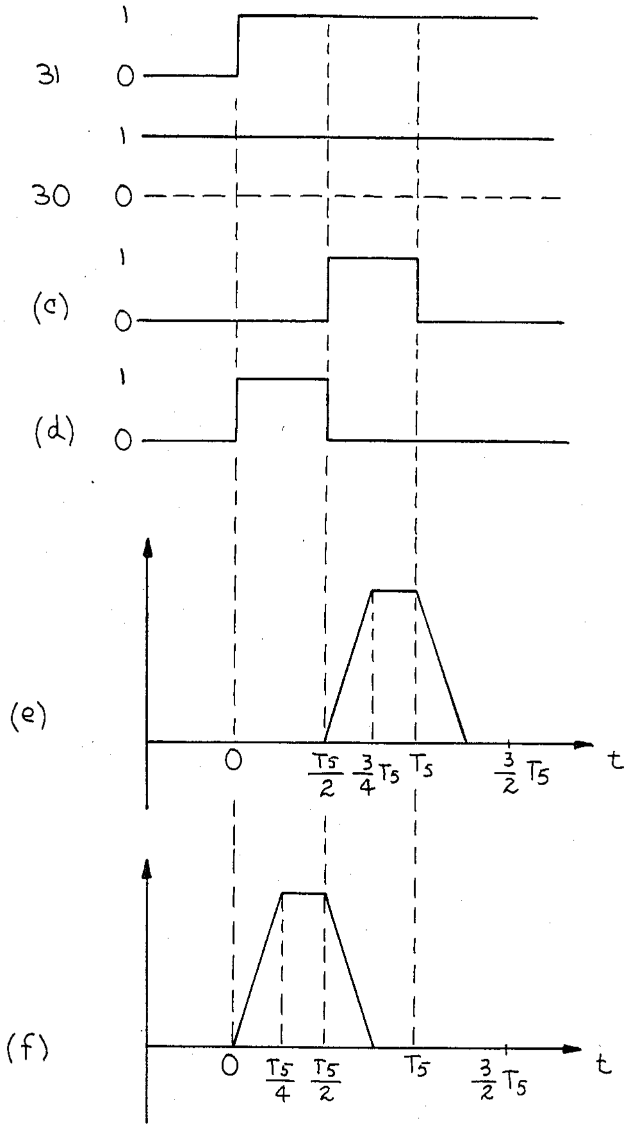
FIGS. 8(*a*) to FIG. 8(*f*) are timing charts of the drive means shown in FIG. 7.

In FIGS. 8(*a*) to 8(*f*), the print timing signal 31 is generated after the print data signal 30 (FIG. 8(*b*)) becomes a "1", as shown in FIG. 8(*a*). The directly supplied pulse generator 34 generates a first print pulse d having a $\tau_5/2$ pulse width, in response to the print timing signal 31, as shown in FIG. 8(*d*). The drive circuit 38 receives the print pulse d via the AND gate 36 and generates a drive pulse f for actuating the transducer 17 as shown in FIG. 8(*f*).

Then, the print timing signal 31, delayed by delayed circuit 32 for the time period $\tau_5/2$, enables the pulse generator 33 to generate a second print pulse c. The drive circuit 37 generates a drive pulse e for actuating the transducer 16 as shown in FIG. 8(*e*). Accordingly, the second (rear) transducer 17 is actuated at first, and then the first (front) transducer 16 is actuated, with a time delay of $\tau_5/2$.

Figure 9:
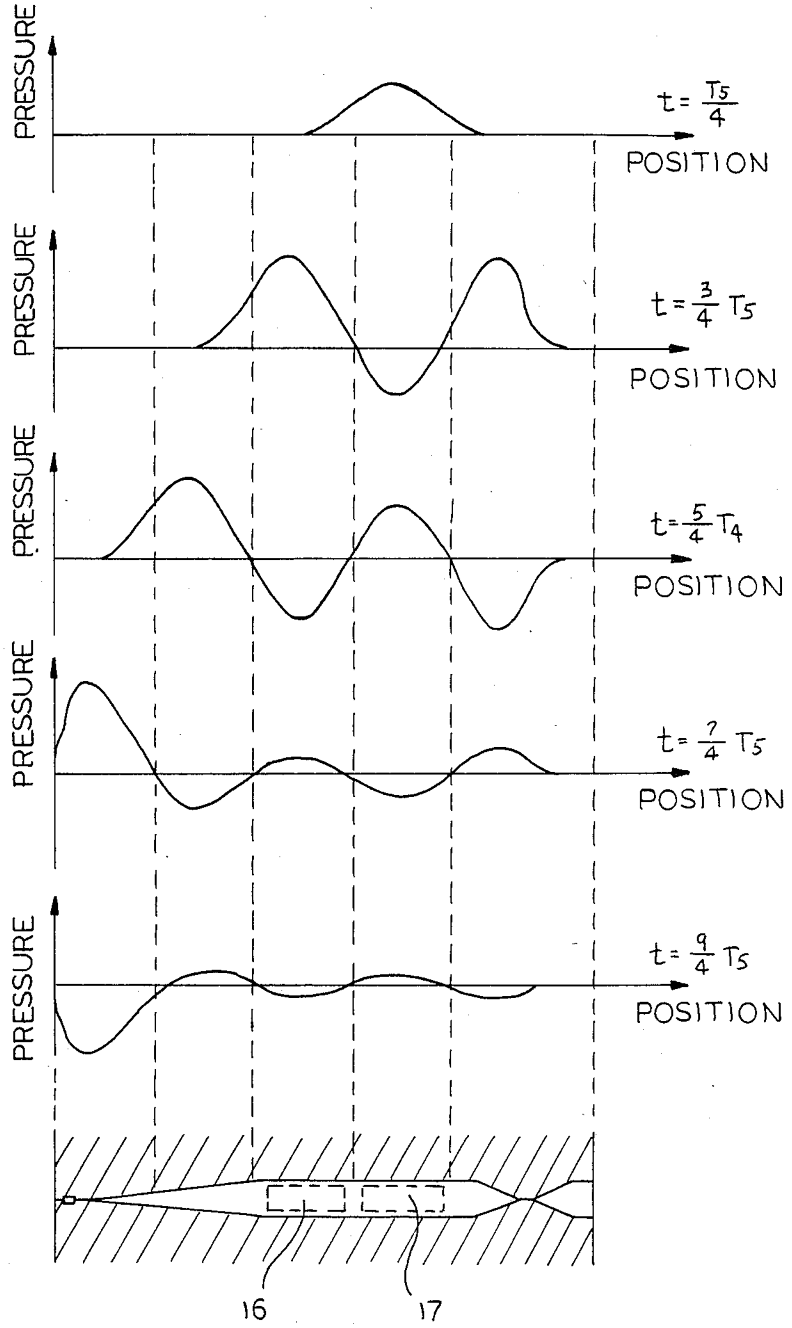
FIGS. 9(*a*) to 9(*e*) illustrate a transmission of vibration in a chamber shown in FIG. 5(*b*).

FIGS. 9(*a*) to 9(*e*) illustrate the transmission of the vibration in the ink chamber 9 caused by the drive pulses e and f. As shown in FIG. 9(*a*), when the second transducer 17 is actuated at time $t=\tau_5/4$, a positive pressure is generated at the position corresponding to the loop or antinode $AN'_4$ (FIG. 6(*b*)). Next, when the positive pressure is transmitted to the loop or antinodes $AN'_3$ and $AN'_5$, i.e., at the time t is$=3\tau_5/4$, the first transducer 16 is actuated to enhance the vibration as shown in FIG. 9(*b*). The pressure vibration wave thus generated is gradually transmitted to the loop or antinode $AN'_2$ (FIG. 9(*c*)) and to the loop or antinode $AN'_1$ (FIG. 9(*d*)). Thus, the 5th order mode for the pressure vibration shown in FIG. 6(*b*) is formed at the time $9\tau_5/4$. The droplet of the ink ejects when the pressure on the loop or antinode $AN'_1$ i.e., the pressure on the nozzle 1, is minimized. That is, the droplet is generated at $t=9\tau_5/4$. (FIG. 9(*e*)).

It is noted that the 5th order mode natural period $\tau_5$ is shorter than the 3rd order mode natural period $\tau_3$. Since the ink ejecting time period $t_1$ to $t_2$ is substantially equal to the period $\tau_5/2$, the droplet volume Q is further reduced in comparison with the volume of the droplet in the first embodiment. In the second embodiment the sectional area A has a rectangular configuration and a size of 40 μm×70 μm. The diameter of the droplet is 40 μm when the droplet velocity is 4 m/s.

As described above, according to the present invention, the piezoelectric transducer is located at the position corresponding to the antinode of the n-th order mode for the pressure vibration harmonics of the ink chamber. Accordingly, the piezoelectric transducer excites only the n-th order mode and the pressure vibration wave generated in the ink chamber has a high frequency, shortening the ink ejecting time period. As a result, fine droplets of ink can be generated without decreasing the droplet velocity. Further, no satellite droplets (excess minute droplets) are generated since the component of the pressure vibration wave includes only the n-th order mode harmonics.

Those who are skilled in the art will readily perceive how to modify the invention. Therefore, the appended claims are to be construed to cover all equivalent structures which fall within the true scope and spirit of the invention.

What is claimed is:

1. A drop-on-demand ink-jet printing apparatus comprising, an ink chamber connected to and filled with an ink supply, said ink chamber including a nozzle for projecting an ink droplet and an elastic surface for deflecting in order to change the volume of said ink chamber, a plurality of pressure vibration modes having a plurality of antinodes when pressure is generated within said ink chamber, and a piezoelectric transducer fixed on said elastic surface at a position corresponding to one of said antinodes of one of said pressure vibration modes, whereby said piezoelectric transducer excites one of said pressure vibration modes in said ink chamber and projects said ink droplet from said nozzle.

2. The drop-on-demand ink-jet printing apparatus as claimed in claim 1, wherein a plurality of piezoelectric transducers are fixed on said elastic surface, each of said transducers being located at positions corresponding to said plurality of antinodes of said one of said pressure vibration modes.

3. The drop-on-demand ink-jet printing apparatus as claimed in claim 2, further comprising a drive means for actuating said piezoelectric transducers, said drive means actuating one of said piezoelectric transducers and then actuating another of said piezoelectric transducers after a predetermined time delay determined by the selected one of said pressure vibration modes.

4. A drop-on-demand ink-jet printing head for projecting a very fine droplet, said head comprising:

an ink chamber having a deflectable elastic surface, a deflection of said surface exciting within the chamber in a plurality of pressure vibration modes, each of said modes having at least a node and an antinode; a nozzle connected to and communicating with the chamber, a pressure increase within the chamber projecting an ink droplet out said nozzle; and a piezoelectric transducer fixed on the elastic surface at an antinode of a preselected one of the pressure vibration modes; whereby said transducer excites substantially only the preselected pressure vibration mode in the ink chamber.

5. The printing head of claim 4, further comprising electronic drive means for actuating the transducer.

6. The printing head of claim 4 wherein the preselected pressure vibration mode is a third order mode of said vibration modes, said third order mode having front, middle, and rear antinodes, said transducer being fixed on the elastic surface at the middle antinode.

7. The printing head of claim 4 wherein a plurality of piezoelectric transducers are fixed on said elastic surface at a corresponding plurality of antinodes of the preselected pressure vibration mode.

8. The printing head of claim 7, further comprising drive means for actuating each of the transducers in turn to enhance the pressure vibration, the actuations of the transducers being separated by time delays which are predetermined in accordance with the preselected pressure vibration mode.

9. The printing head of claim 7 wherein there are two of said piezoelectric transducers, each of said transducers being fixed on said elastic surface at a respective one of the antinodes of the fifth order mode of said vibration modes.

10. The printing head of claim 9 wherein said two transducers are affixed to said elastic surface at adjacent antinodes and the head further comprises a drive means for (i) initially actuating the transducer furthest from the nozzle, (ii) waiting an interval equal to one half the natural resonant period of the fifth order pressure vibration mode, and (iii) then actuating the other transducer.

11. The printing head of claim 7, further comprising a drive means for actuating each of the transducers in turn to enhance the pressure vibration, the actuations being separated by predetermined time delays in accordance with the preselected pressure vibration mode .

12. A method of projecting fine ink droplets on demand, comprising the steps of:

(a) providing an ink chamber having a plurality of pressure vibration modes, each mode having at least one node and antinode;
(b) providing a deflectable plastic surface on and an outlet nozzle at one end of a wall of the chamber;
(c) supplying ink to the chamber from an ink supply means;
(d) disposing a first piezoelectric transducer on the elastic surface at an antinode of a preselected one of the pressure vibration modes; and
(e) pulsing the transducer from a drive means to deflect the plastic surface into the chamber to excite pressure vibrations of the preselected vibration mode in the chamber; whereby an ink droplet is ejected from the nozzle.

13. The method of claim 12 wherein step (d) includes disposing the transducer at the middle antinode of the third order pressure vibration mode.

14. The method of claim 12 wherein there are at least two of said antinodes and further step (d) includes disposing a second transducer on the elastic surface at another of the antinodes of the preselected pressure vibration mode, and step (e) includes pulsing the second transducer after a predetermined delay following a pulsing of the 1st transducer to enhance the pressure vibrations.

15. The method of claim 14 wherein the two transducers are disposed at adjacent antinodes of the fifth order pressure vibration mode and the predetermined delay equals one half the natural resonant period of the fifth order pressure vibration mode.

* * * * *